(12) United States Patent
Tomeba et al.

(10) Patent No.: US 11,470,638 B2
(45) Date of Patent: Oct. 11, 2022

(54) TERMINAL APPARATUS AND COMMUNICATION METHOD

(71) Applicant: SHARP KABUSHIKI KAISHA, Sakai (JP)

(72) Inventors: Hiromichi Tomeba, Sakai (JP); Tomoki Yoshimura, Sakai (JP); Takashi Onodera, Sakai (JP); Yasuhiro Hamaguchi, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 15/554,717

(22) PCT Filed: Mar. 10, 2016

(86) PCT No.: PCT/JP2016/057503
§ 371 (c)(1),
(2) Date: Aug. 31, 2017

(87) PCT Pub. No.: WO2016/143842
PCT Pub. Date: Sep. 15, 2016

(65) Prior Publication Data
US 2018/0242358 A1 Aug. 23, 2018

(30) Foreign Application Priority Data
Mar. 11, 2015 (JP) .............................. JP2015-047816

(51) Int. Cl.
*H04B 17/318* (2015.01)
*H04W 52/24* (2009.01)
(Continued)

(52) U.S. Cl.
CPC ....... *H04W 74/0808* (2013.01); *H04W 52/04* (2013.01); *H04W 52/346* (2013.01); *H04W 84/12* (2013.01)

(58) Field of Classification Search
CPC ......... H04W 74/0808; H04W 74/0816; H04W 84/12; H04W 52/367; H04W 72/08;
(Continued)

(56) References Cited

U.S. PATENT DOCUMENTS 7,555,056 B2   6/2009  Hara et al.
9,723,611 B2   8/2017  Seok
(Continued)

FOREIGN PATENT DOCUMENTS

JP   2006-245897 A   9/2006
JP   2007-134905 A   5/2007
(Continued)

OTHER PUBLICATIONS

Coffey Sean et al., A Protocol Framework for Dynamic CCA, IEEE802.11-14/0872r0, Jul. 14, 2014,slide2,3,9-15.
(Continued)

*Primary Examiner* — Khaled M Kassim
*Assistant Examiner* — Jason A Harley
(74) *Attorney, Agent, or Firm* — ScienBiziP, P.C.

(57) ABSTRACT

Provided are a terminal apparatus and a communication method that are able to improve communication quality and an acquisition rate of transmission opportunity in a communication system requiring carrier sense. The terminal apparatus of the invention includes a reception unit that receives a frame and changes a CCA method on the basis of information included in the frame. The CCA method includes a method of setting a CCA level as a value other than a predetermined value of the CCA level. The reception unit has a function of performing carrier sense and a method of changing the CCA level includes a method of setting a period in which the carrier sense is performed as a value other than a value of a predetermined carrier sense period.

2 Claims, 3 Drawing Sheets

(51) Int. Cl.
*H04L 12/413* (2006.01)
*H04W 72/04* (2009.01)
*H04L 27/28* (2006.01)
*H04W 52/04* (2009.01)
*H04L 1/00* (2006.01)
*H04L 5/00* (2006.01)
*H04W 74/08* (2009.01)
*H04W 52/34* (2009.01)
*H04W 84/12* (2009.01)

(58) Field of Classification Search
CPC .............. H04W 52/241; H04W 52/146; H04L 5/0055; H04L 12/413; H04B 17/318
USPC ....................................................... 370/445
See application file for complete search history.

(56) References Cited

U.S. PATENT DOCUMENTS

| | | | |
|---|---|---|---|
| 9,913,296 B2 | 3/2018 | Seok | |
| 2004/0190460 A1* | 9/2004 | Gaskill | H04L 12/40169 370/254 |
| 2006/0203833 A1 | 9/2006 | Hara et al. | |
| 2007/0133473 A1* | 6/2007 | Takagi | H04W 74/08 370/334 |
| 2008/0192644 A1* | 8/2008 | Utsunomiya | H04W 72/082 370/252 |
| 2009/0273520 A1* | 11/2009 | Shao | H04W 72/046 342/417 |
| 2011/0038383 A1* | 2/2011 | Ibrahim | H04W 52/267 370/445 |
| 2011/0164514 A1* | 7/2011 | Afkhamie | H04W 52/42 370/252 |
| 2013/0223250 A1* | 8/2013 | Matsuo | G08B 5/36 370/252 |
| 2013/0235737 A1* | 9/2013 | Merlin | H04W 74/0808 370/252 |
| 2015/0098378 A1* | 4/2015 | Dore | H04W 24/02 370/311 |
| 2016/0007379 A1 | 1/2016 | Seok | |
| 2016/0050634 A1* | 2/2016 | Seok | H04W 52/146 370/338 |
| 2016/0105888 A1 | 4/2016 | Seok | |
| 2016/0309480 A1* | 10/2016 | Verma | H04W 52/267 |
| 2017/0041738 A1* | 2/2017 | Batra | H04W 52/367 |
| 2017/0181102 A1* | 6/2017 | Bharadwaj | H04W 52/242 |

FOREIGN PATENT DOCUMENTS

| | | |
|---|---|---|
| JP | 2013-175940 A | 9/2013 |
| WO | 2014/178678 A1 | 11/2014 |

OTHER PUBLICATIONS

John (Ju-Hyung) Son et al.,"Measurements on CCA thresholds in OBSS environment" IEEE 802.11-14/0628r0, May 2014.
John(Ju-Hyung) Son et al., "Legacy Fairness Issues of Enhanced CCA", IEEE 802.11-15/0085r0, Jan. 12, 2015.
Reza Hedayat et al., "Considerations for Adaptive CCA", Nov. 3, 2014, doc.: IEEE 802.11-14/1448r2.

* cited by examiner

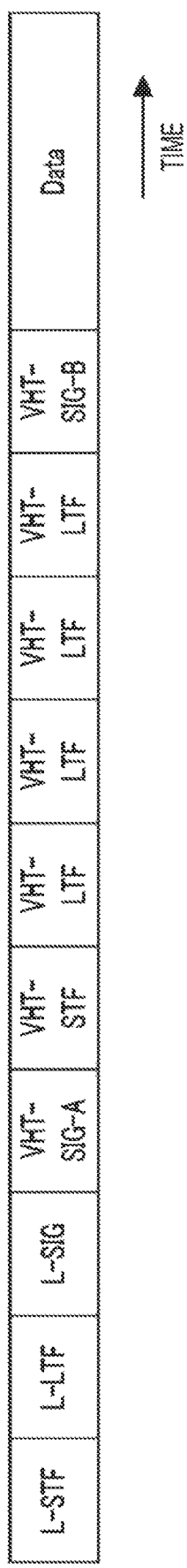

TERMINAL APPARATUS AND COMMUNICATION METHOD

TECHNICAL FIELD

The present invention relates to a terminal apparatus and a communication method.

BACKGROUND ART

As an advanced standard of IEEE802.11n which is a radio LAN (Local area network) standard that has been widely put into use, an IEEE802.11ac standard has been developed by the IEEE (The Institute of Electrical and Electronics Engineers, Inc.). Currently, standardization efforts for IEEE802.11ax are conducted as a successive standard of IEEE802.11n/ac. In the current radio LAN system, interference due to an increase in the number of terminals per unit area is becoming a large problem, and such a congestion environment needs to be considered in an IEEE802.11ax standard. On the other hand, differently from the past radio LAN standards, not only improvement of peak throughput but also improvement of user throughput are discussed as main requirements in the IEEE802.11ax standard. It is essential to introduce a highly efficient simultaneous multiplexing transmission scheme (access scheme) in order to improve the user throughput.

In standards before the IEEE802.11n standard, an autonomous distributed control access scheme called CSMA/CA (Carrier sense multiple access with collision avoidance) has been adopted as the access scheme. In IEEE802.11ac, space division multiple access (SDMA) by a multi-user multiple-input multiple-output (MU-MIMO) technique is newly added.

The IEEE802.11ax standard is required to have a backward compatibility with the existing IEEE802.11 standard. This suggests that the IEEE802.11ax standard is also required to support an access scheme based on the CSMA/CA. However, the CSMA/CA requiring carrier sense before transmission has such a problem that communication opportunity is significantly reduced because of interference between terminal apparatuses in the congestion environment as described above. Thus, change of a threshold (CCA level, CCA threshold) of clear channel assessment (CCA) by carrier sense has been recently discussed for the purpose of improving the communication opportunity by allowing a cretin degree of interference (NPL 1 etc.). Since a terminal apparatus stops communication when interference having the CCA level or more is measured by carrier sense, by increasing the CCA level, the terminal apparatus is less likely to miss the communication opportunity even under the congestion environment. When the terminal apparatus has transmit power lower than predetermined transmit power, it is possible to improve the communication opportunity of another terminal apparatus under the congestion environment.

CITATION LIST

Non Patent Literature

NPL 1: IEEE 11-14/0628r0, "Measurements on CCA thresholds in OBSS environment", May 2014.

SUMMARY OF INVENTION

Technical Problem

However, when the terminal apparatus has increased CCA level, of course, reduction of reception quality due to interference is caused. When the terminal apparatus has transmit power lower than the predetermined transmit power, reduction of reception quality is also caused. Though communication quality is expected to be kept to some extent by a packet capture effect peculiar to packet transmission, an increase in a packet error rate has non-negligible influence on transmission performance.

The invention has been made in view of such circumstances and an object thereof is to provide a terminal apparatus and a communication method that are able to improve communication quality and an acquisition rate of transmission opportunity in a communication system in which there are a plurality of terminal apparatuses whose CCA level and transmit power are variable in a communication system requiring carrier sense.

Solution to Problem

A terminal apparatus and a communication method according to the invention for solving the aforementioned problems are as follows.

(1) That is, a terminal apparatus of the invention is a terminal apparatus that performs communication with a different terminal apparatus, and includes a reception unit that receives a frame and changes a method of deciding a CCA level on a basis of information included in the frame.

(2) The terminal apparatus of the invention is the terminal apparatus according to (1) above, in which the method of deciding the CCA level includes a method of setting the CCA level as a value other than a predetermined value of the CCA level.

(3) The terminal apparatus of the invention is the terminal apparatus according to (2) above, in which the information included in the frame received by the reception unit is information indicating a frame type of the frame, and in a case where the information indicating the frame type indicates a predetermined frame type, the reception unit sets the CCA level as the predetermined value, and in a case where the information indicating the frame type indicates a frame type other than the predetermined frame type, the reception unit sets the CCA level as the value other than the predetermined value.

(4) The terminal apparatus of the invention is the terminal apparatus according to (2) above, in which the information included in the frame received by the reception unit is information indicating whether or not the frame is a first transmission frame, and in a case where the information indicating whether or not to be a first transmission frame indicates that the frame is the first transmission frame, the reception unit sets the CCA level as the predetermined value, and in a case where the information indicating whether or not to be a first transmission frame indicates that the frame is a retransmission frame, the reception unit sets the CCA level as the predetermined value.

(5) The terminal apparatus of the invention is the terminal apparatus according to (2) above, which further includes a transmission unit that transmits a frame for transmission and in which the reception unit sets the CCA level as the value other than the predetermined value on a basis of information included in the frame for transmission.

(6) The terminal apparatus of the invention is the terminal apparatus according to (5) above, in which the information included in the frame for transmission is information indicating a frame type of the frame for transmission, and in a case where the information indicating the frame type of the frame for transmission indicates a predetermined frame type, the reception unit sets the CCA level as the predetermined value, and in a case where the information indicating the frame type of the frame for transmission indicates a frame type other than the predetermined frame type, the reception unit sets the CCA level as the value other than the predetermined value.

(7) The terminal apparatus of the invention is the terminal apparatus according to (5) above, in which the information included in the frame for transmission is information indicating whether or not the frame for transmission is a first transmission frame, and in a case where the information indicating whether or not the frame for transmission is a first transmission frame indicates that the frame for transmission is the first transmission frame, the reception unit sets the CCA level as the predetermined value, and in a case where the information indicating whether or not the frame for transmission is a first transmission frame indicates that the frame for transmission is a retransmission frame, the reception unit sets the CCA level as the value other than the predetermined value.

(8) The terminal apparatus of the invention is the terminal apparatus according to any one of (5) to (7) above, in which in a case of transmitting the frame for transmission, the transmission unit uses different methods of deciding transmit power between a case where information included in a frame received by the reception unit indicates a predetermined value and a case where the information indicates a value other than the predetermined value.

(9) The terminal apparatus of the invention is the terminal apparatus according to any one of (5) to (7) above, in which in a case of transmitting the frame for transmission by the transmission unit, the transmission unit uses different methods of deciding transmit power between a case where information included in the frame for transmission indicates a predetermined value and a case where the information indicates a value other than the predetermined value.

(10) The terminal apparatus of the invention is the terminal apparatus according to (8) above, in which the transmission unit includes, in the frame for transmission, information indicating that change of methods of deciding the CCA level and the transmit power is prohibited.

(11) The terminal apparatus of the invention is the terminal apparatus according to any one of (8) to (10) above, in which a difference between a predetermined value of the transmit power and a value other than the predetermined value of the transmit power and a difference between the predetermined value of the CCA level and the value other than the predetermined value of the CCA level are associated with each other.

(12) The terminal apparatus of the invention is the terminal apparatus according to any one of (2) to (10) above, in which the predetermined value of the CCA level is −82 dBm in a case where a communication bandwidth is 20 MHz.

(13) The terminal apparatus of the invention is the terminal apparatus according to (1) above, in which the reception unit has a function of performing carrier sense, and a method of changing the CCA level includes a method of setting a period in which the carrier sense is performed as a value other than a value of a predetermined carrier sense period.

(14) A communication method of the invention is a communication method of a terminal apparatus performing communication with a different terminal apparatus, and the communication method includes the steps of: receiving a frame; and changing a method of deciding a CCA level on a basis of information included in the frame.

Advantageous Effects of Invention

According to the invention, since it is possible to improve communication quality and an acquisition rate of communication opportunity in a communication system in which there are a plurality of terminal apparatuses whose CCA level and transmit power are variable in a communication system requiring carrier sense, it is possible to greatly improve user throughput.

BRIEF DESCRIPTION OF DRAWINGS

FIG. 3 illustrates a configuration example of a frame configuration of a signal of the invention.

DESCRIPTION OF EMBODIMENTS

1. First Embodiment

Figure 1:
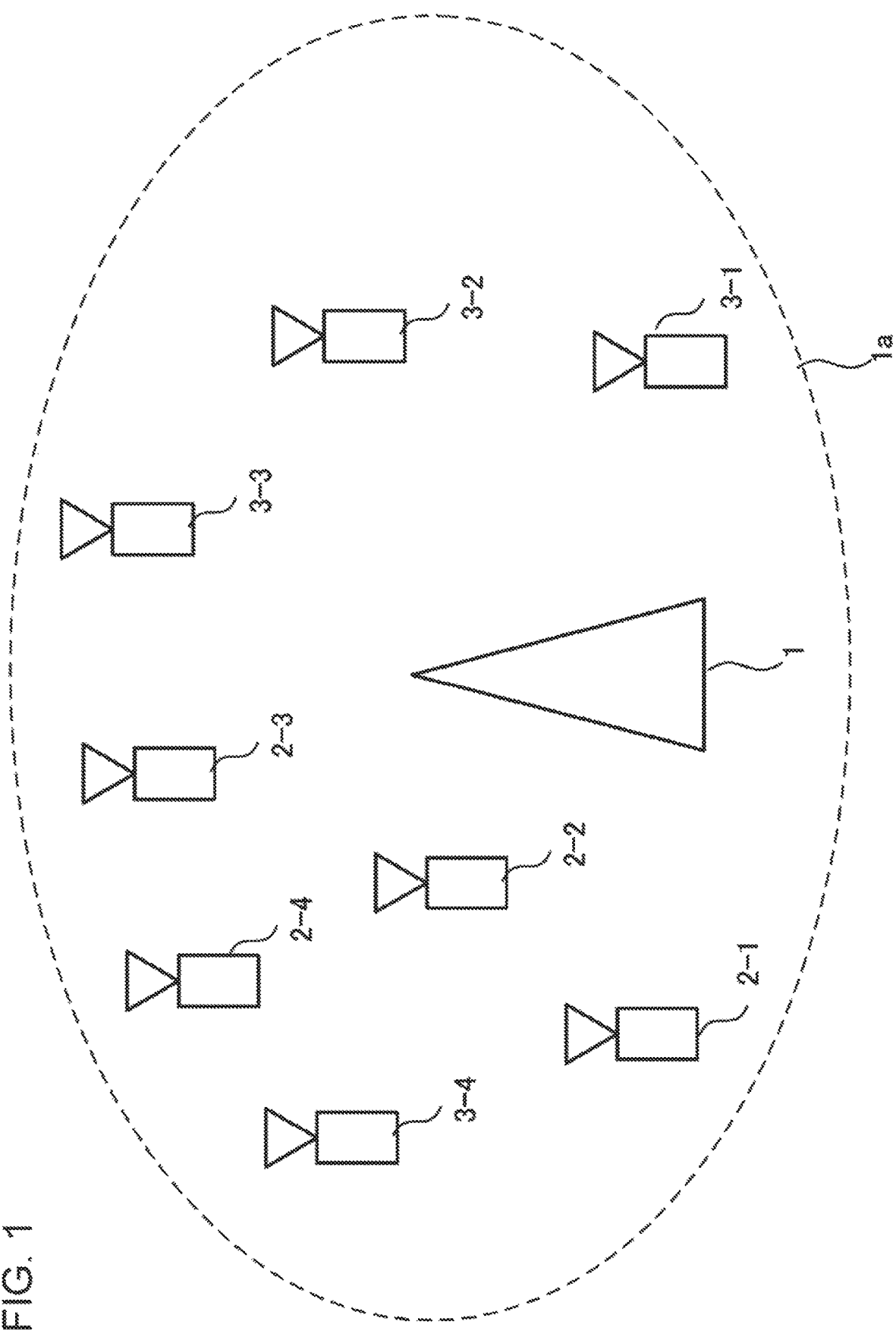
FIG. 1 illustrates an example of a communication system according to the invention.

A communication system in the present embodiment includes a radio transmission apparatus (access point (AP)) and a plurality of radio receiving apparatuses (stations (STAs)). A network composed of the AP and the STAs is called a basic service set (BSS).

The AP and the STAs in the BSS perform communication on the basis of CSMA/CA (Carrier sense multiple access with collision avoidance). Though the present embodiment is intended for an infrastructure mode in which the AP performs communication with a plurality of STAs, a method of the present embodiment may be carried out also in an ad hoc mode in which STAs directly perform communication with each other.

In an IEEE802.11 system, apparatuses are able to transmit transmission frames of a plurality of frame types having a common frame format. The transmission frames are defined by a physical (PHY) layer, a medium access control (MAC) layer, and a logical link control (LLC) layer.

The transmission frame of the PHY layer is called a physical protocol data unit (PHY protocol data unit: PPDU). The PPDU is constituted by a physical layer header (PHY header) including, for example, header information for performing signal processing in the physical layer, a physical service data unit (PHY service data unit: PSDU) that is a data unit processed in the physical layer, and the like. The PSDU is able to be constituted by an aggregated MPDU (A-MPDU) in which a plurality of MAC protocol data units (MPDUs) each of which serves as a retransmission unit in a radio section are aggregated.

The PHY header includes reference signals of, for example, a short training field (STF) used for signal detection, synchronization, and the like and a long training field (LTF) used for acquiring channel information for data demodulation, and control signals such as signals (SIGs) in which control information for data demodulation is included. The STF is classified in accordance with a corresponding standard into a legacy-STF (L-STF), a high throughput-STF (HT-STF), a very high throughput-STF (VHT-STF), and the like, and the LTF or the SIG is also classified similarly into an L-LTF, an HT-LTF, a VHT-LTF, an L-SIG, an HT-SIG, and a VHT-SIG. The VHT-SIG is further classified into a VHT-SIG-A and a VHT-SIG-B.

The PPDU is modulated in accordance with a corresponding standard. For example, in the case of an IEEE802.11n standard, the PPDU is modulated to an orthogonal frequency division multiplexing (OFDM) signal.

The MPDU is constituted by a MAC layer header (MAC header) in which, for example, header information for performing signal processing in the MAC layer is included, a MAC service data unit (MSDU) or a frame body that is a data unit processed in the MAC layer, and a frame check sequence (FCS) for checking whether or not there is an error in a frame. A plurality of MSDUs are also able to be aggregated as an aggregated MSDU (A-MSDU).

The frame type of the transmission frame of the MAC layer is roughly classified into three data frames of a management frame in which, for example, a connection state between apparatuses is managed, a control frame in which a communication state between apparatuses is managed, and a data frame including actual transmission data, and each of the frames is further classified into a plurality of kinds of sub-frame types. The control frame includes a reception completion notification (Acknowledge: ACK) frame, a transmission request (Request to send: RTS) frame, a reception preparation completion (Clear to send: CTS) frame, and the like. The management frame includes a beacon frame, a probe request frame, a probe response frame, an authentication frame, a connection request (association request) frame, a connection response (association response) frame, and the like. The data frame includes a data frame, a polling (CF-poll) frame, and the like. Each apparatus is able to grasp a frame type and a sub-frame type of a received frame by reading content of a frame control field included in a MAC header.

The beacon frame includes an interval (Beacon interval) in which beacon is transmitted and a field in which information (Service set identifier (SSID) or the like) for identifying an AP is described. The AP is able to periodically broadcast a beacon frame into a BSS and an STA is able to grasp the AP around the STA by receiving the beacon frame. Grasping of the AP by the STA based on a signal that is broadcasted from the AP is referred to as passive scanning. On the other hand, probing of the AP by broadcasting a probe request frame into the BSS by the STA is referred to as active scanning. The AP is able to transmit a probe response frame as a response to the probe request frame and description content of the probe response frame is equivalent to that of the beacon frame.

The STA recognizes the AP and then performs connection processing for the AP. The connection processing is classified into an authentication procedure and a connection (association) procedure. The STA transmits an authentication frame to the AP that desires connection. Upon reception of the authentication frame, the AP transmits, to the STA, an authentication frame including a status code indicating, for example, whether or not to authenticate the STA. By reading the status code described in the authentication frame, the STA is able to determine whether or not authentication for the STA is allowed by the AP. Note that, the AP and the STA are able to exchange an authentication frame a plurality of times.

Subsequently to the authentication procedure, the STA transmits a connection request frame to the AP to perform the connection procedure. Upon reception of the connection request frame, the AP determines whether or not to allow connection of the STA and transmits a connection response frame to notify whether or not to allow the connection. In addition to the status code indicating whether or not connection processing is allowed, an association identification number (Association identifier: AID) for identifying the STA is described in the connection response frame. The AP is able to manage a plurality of STAs by setting different AIDs to the STAs that have been allowed to make connection.

After the connection processing is performed, the AP and the STA perform actual data transmission. In the IEEE802.11 system, a distributed coordination function (DCF), a point coordination function (PCF), and an extended function thereof (such as a hybrid coordination function: HCF) are defined. Description will be given below by taking a case where the AP transmits a signal to the STA by the DCF as an example.

In the DCF, prior to communication, the AP and the STA perform carrier sense (CS) for checking a usage state of a radio channel around the AP and the STA. For example, in a case where the AP serving as a transmission station receives, by the radio channel, a signal having a level higher than a clear channel assessment level (CCA level) that is defined in advance, the AP postpones transmission of a transmission frame by the radio channel. Hereinafter, in the radio channel, a state in which a signal having a level equal to or greater than the CCA level is detected is referred to as a busy state and a state in which a signal having a level equal to or greater than the CCA level is not detected is referred to as an idle state. The CS performed by each apparatus on the basis of power of an actually received signal in this manner is called physical carrier sense (physical CS). Note that, the CCA level is also referred to as a carrier sense level (CS level) or a CCA threshold (CCAT). Note that, when detecting a signal having a level equal to or greater than the CCA level, the AP and the STA start an operation of demodulating at least a signal of the PHY layer.

The AP performs carrier sense during a frame interval (Inter frame space: IFS) according to a type of the transmission frame to be transmitted and determines whether the radio channel is in the busy state or the idle state. A time period in which the AP performs the carrier sense varies in accordance with a frame type and a sub-frame type of the transmission frame to be transmitted by the AP. In the IEEE802.11 system, a plurality of IFSs having different time periods are defined, and there are a short frame interval (Short IFS: SIFS) used for a transmission frame to which highest priority is given, a polling frame interval (PCF IFS: PIFS) used for a transmission frame having relatively high priority, a distributed control frame interval (DCF IFS: DIFS) used for a transmission frame having lowest priority, and the like. When the AP transmits a data frame by the DCF, the AP uses the DIFS.

The AP waits for the DIFS and then further waits for a random back-off time for preventing frame collision. The random back-off time called contention window (CW) is used in the IEEE802.11 system. In the CSMA/CA, it is premised that a transmission frame transmitted by a certain transmission station is received by a reception station in a state where there is no interference from other transmission stations. Therefore, when transmission frames are transmitted by transmission stations at the same timing, the frames collide with each other so that the reception station is not able to receive the transmission frames correctly. Thus, when each of the transmission stations waits for a time that is set randomly before starting the transmission, the frame collision is prevented. When determining that the radio channel is in the idle state by the carrier sense, the AP starts countdown of the CW, acquires a transmission right only when the CW indicates 0, and is allowed to transmit a data frame to the STA. Note that, in a case where the AP determines that the radio channel is in the busy state by the carrier sense during countdown of the CW, the AP stops countdown of the CW. In a case where the radio channel is brought into the idle state, the AP restarts countdown of the remaining CW subsequently to the previous IFS.

The STA serving as a reception station receives a transmission frame, reads a PHY header of the transmission frame, and demodulates the received transmission frame. By reading a MAC header of a demodulated signal, the STA is able to recognize whether or not the transmission frame is addressed to the STA. Note that, the STA is also able to determine an address of the transmission frame on the basis of information (for example, a group identification number (Group identifier: Group ID) described in the VHT-SIG-A) described in the PHY header.

When the STA determines that the received transmission frame is addressed to the STA and the transmission frame is demodulated without error, the STA needs to transmit, to the AP serving as the transmission station, an ACK frame indicating that the frame is able to be received correctly. The ACK frame is one of transmission frames that are transmitted only by waiting for the time period of the SIFS (without taking the random back-off time) and that have highest priority. Upon reception of the ACK frame transmitted from the STA, the AP ends a series of communication. Note that, when the STA is not able to receive the frame correctly, the STA does not transmit the ACK. Thus, when the AP has not received the ACK frame from the reception station for a fixed time period (length of SIFS+ACK frame) after the frame transmission, it is considered that communication has failed and the communication ends. In this manner, the end of one communication (also referred to as burst) of the IEEE802.11 system is always determined on the basis of whether or not the ACK frame is received except for special cases such as a case where a broadcast signal such as a beacon frame is transmitted and a case where fragmentation for fragment of transmission data is used.

When determining that the received transmission frame is not addressed to the STA, the STA sets a network allocation vector (NAV) on the basis of a length of the transmission frame described in the PHY header or the like. The STA does not attempt to perform communication during a time period that is set to the NAV. That is, since the STA performs, during the time period that is set to the NAV, the same operation as the operation performed when it is determined that the radio channel is in the busy state by the physical CS, communication control by the NAV is also called virtual carrier sense (virtual CS). The NAV is set not only on the basis of information described in the PHY header, but also by a transmission request (Request to send: RTS) frame or a reception preparation completion (Clear to send: CTS) frame that is introduced to solve a hidden node problem.

While each apparatus performs carrier sense to autonomously acquire a transmission right in the DCF, a control station called a point coordinator (PC) controls a transmission right of each apparatus in the BSS in the PCF. The AP generally serves as the PC and acquires a transmission right of the STA in the BSS.

A communication period by the PCF includes a contention free period (CFP) and a contention period (CP). Communication is performed on the basis of the DCF described above during the CP and the PC controls the transmission right during the CFP. The AP serving as the PC broadcasts a beacon frame, in which a time period of the CFP (CFP Max duration) or the like is described, into the BSS prior to communication by the PCF. Note that, the PIFS is used to transmit the beacon frame that is broadcasted when transmission of the PCF starts and the beacon frame is transmitted without waiting for the CW. The STA having received the beacon frame sets the time period of the CFP described in the beacon frame to the NAV. After that, until the NAV has lapsed or a signal (for example, a data frame including CF-end) by which end of the CFP is broadcasted into the BSS is received, the STA is able to acquire the transmission right only when the STA receives a signal (for example, a data frame including CF-poll) that is transmitted by the PC and signals acquisition of the transmission right. Note that, since collision of packets in the same BSS does not occur during the time period of the CFP, each STA does not require the random back-off time used in the DCF.

The AP and the STA included in the communication system according to the present embodiment have the functions of performing a series of communication based on the CSMA/CA described above, but do not need to always have all the functions.

FIG. 1 is a schematic view illustrating an example of downlink of the communication system according to the first embodiment of the invention. In the communication system of FIG. 1, there is an AP 1 and a reference sign 1a denotes a range (coverage range, Basic service set (BSS)) that is able to be managed by the AP 1. In the BSS 1a, there are STAs 2-1 to 2-4 connected to the AP 1 and STAs 3-1 to 3-4 that are existing terminal apparatuses (conventional terminal apparatuses, legacy terminal apparatuses). Hereinafter, the STAs 2-1 to 2-4 are simply referred to also as STAs 2 or first radio receiving apparatuses. Similarly, the STAs 3-1 to 3-4 are simply referred to also as STAs 3 or second radio receiving apparatuses. Compatible standards of the AP 1, the STAs 2, and the STAs 3 are different from each other. For example, the AP 1 and the STAs 2 are apparatuses to which the invention is able to be applied and the STAs 3 are apparatuses to which the invention is not applied.

The AP 1, the STAs 2, and the STAs 3 perform communication on the basis of the CSMA/CA. Though the present embodiment is intended for an infrastructure mode in which each of the STAs 2 and the STAs 3 performs communication with the AP 1, a method of the present embodiment may be carried out also in an ad hoc mode in which STAs directly perform communication with each other. Note that, in the following description, a case where the AP transmits a frame to each of the STAs 2 will be described as an example, and the description is similarly applied to a case where the STA 2 performs transmission to the AP.

Figure 2:
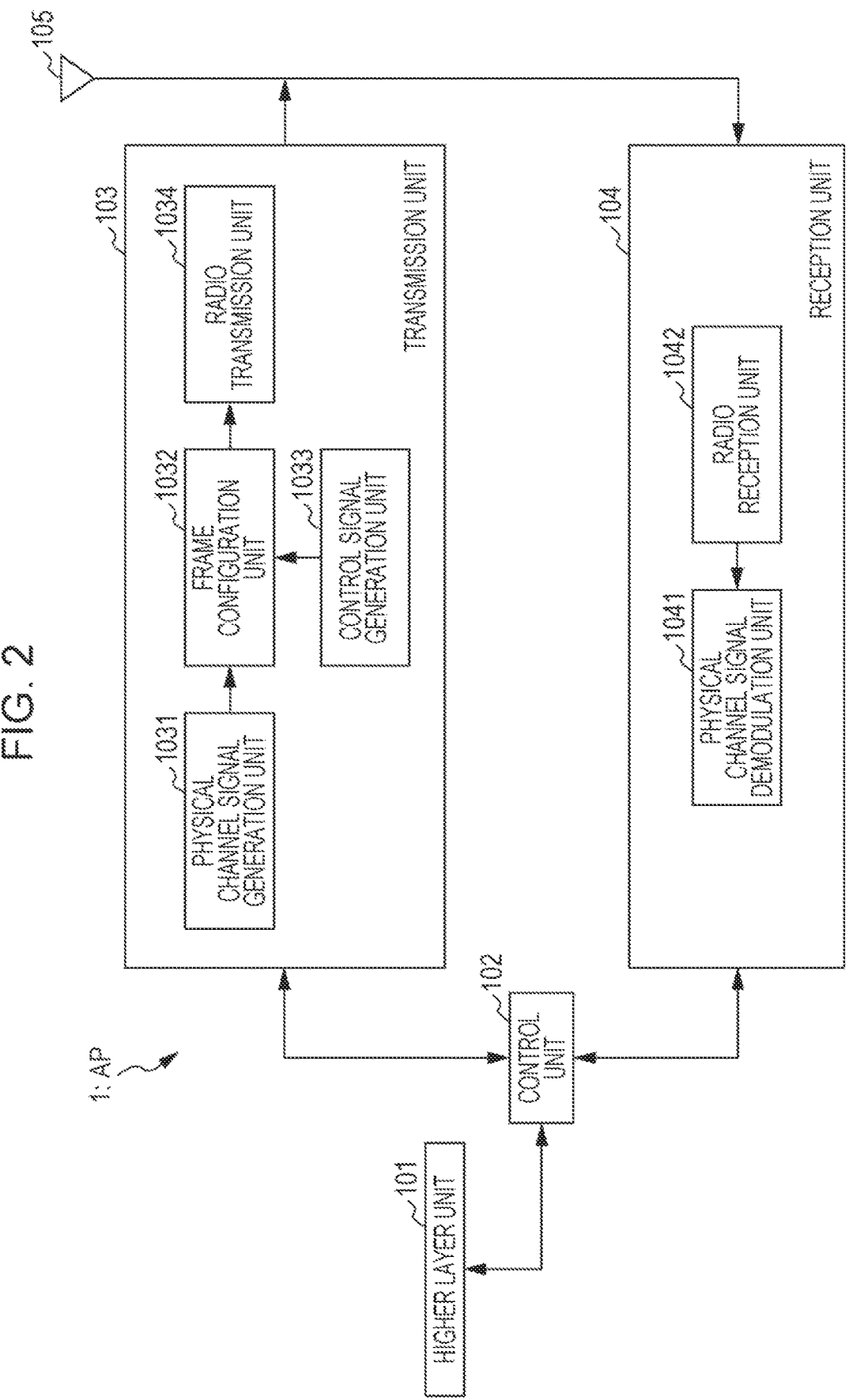
FIG. 2 is a schematic block diagram illustrating a configuration example of a radio transmission apparatus according to the invention.

FIG. 2 is a block diagram illustrating an example of a configuration of the AP 1 according to the first embodiment of the invention. As illustrated in FIG. 2, the AP 1 includes a higher layer unit 101, a control unit 102, a transmission unit 103, a reception unit 104, and an antenna 105. Note that, a method described below is also applicable to a case where the STA 2 transmits a frame. That is, an example of a configuration of the STA 2 according to the present embodiment is also provided as illustrated in the block diagram of FIG. 2. In the following description, the AP 1 and the STAs 2 are also referred to as a terminal apparatus as a whole.

The higher layer unit 101 performs processing in a medium access control (MAC) layer and the like. The higher layer unit 101 generates information for performing control of the transmission unit 103 and the reception unit 104 and outputs the information to the control unit 102. The control unit 102 controls the higher layer unit 101, the transmission unit 103, and the reception unit 104.

The transmission unit 103 further includes a physical channel signal generation unit 1031, a frame configuration unit 1032, a control signal generation unit 1033, and a radio transmission unit 1034. The physical channel signal generation unit 1031 generates baseband signals to be transmitted by the AP 1 to the STAs. The signals generated by the physical channel signal generation unit 1031 include TFs (Training fields) used by the STAs for channel estimation and data transmitted in an MSDU (MAC service data unit). Note that, an example in which the baseband signals to be transmitted to the STAs 2-1 to 2-4 and the STAs 3-1 to 3-4 are generated is indicated because the number of the STAs is eight in FIG. 1, but the present embodiment is not limited thereto.

The frame configuration unit 1032 multiplexes a signal generated by the physical channel signal generation unit 1031 and a signal generated by the control signal generation unit 1033, and configures a transmission frame of the baseband signal to be actually transmitted by the AP 1.

FIG. 3 is a schematic view illustrating an example of a transmission frame generated by the frame configuration unit 1032 according to the present embodiment. The transmission frame includes reference signals such as an L-STF, an L-LTF, a VHT-STF, and a VHT-LTF. The transmission frame also includes control information such as an L-SIG, a VHT-SIG-A, and a VHT-SIG-B. The transmission frame further includes a Data portion. The configuration of the transmission frame generated by the frame configuration unit 1032 is not limited to FIG. 4 and may include other control information (for example, an HT-SIG), reference signals (for example, an HT-LTF), and the like. The transmission frame generated by the frame configuration unit 1032 does not need to include all the signals such as the L-STF and the VHT-SIG-A. Note that, since control information included in the L-SIG or the like is information required to demodulate the Data portion, control information included in the L-SIG or the like will be described below also as a physical layer header (PHY header).

The transmission frame generated by the frame configuration unit 1032 is classified into some frame types. For example, the frame configuration unit 1032 is able to generate transmission frames of three frame types of a management frame in which, for example, a connection state between apparatuses is managed, a control frame in which a communication state between apparatuses is managed, and a data frame including actual transmission data. The frame configuration unit 1032 is able to include information indicating a frame type to which the transmission frame to be generated belongs in a medium access control layer header (MAC header) transmitted in the Data portion.

The radio transmission unit 1034 performs processing of converting the baseband signals generated by the frame configuration unit 1032 into radio frequency (RF) band signals. The processing performed by the radio transmission unit 1034 includes digital/analog conversion, filtering, frequency conversion from the baseband to the RF band, and the like.

The antenna 105 transmits signals generated by the transmission unit 103 to the STAs.

The AP 1 also has a function of receiving signals transmitted from the STAs. The antenna 105 receives the signals transmitted from the STAs and outputs the signals to the reception unit 104.

The reception unit 104 includes a physical channel signal demodulation unit 1041 and a radio reception unit 1042. The radio reception unit 1042 converts RF band signals input from the antenna 105 to baseband signals. The processing performed by the radio reception unit 1042 includes frequency conversion from the RF band to the baseband, filtering, analog/digital conversion, and the like. The processing performed by the reception unit 104 may include a function (carrier sense) of measuring peripheral interference in a specific frequency band to reserve the frequency band.

The physical channel signal demodulation unit 1041 demodulates the baseband signals output by the radio reception unit 1042. The signals demodulated by the physical channel signal demodulation unit 1041 are signals transmitted in uplink by the STAs 2 and the STAs 3, and have a frame configuration similar to that of the data frame generated by the frame configuration unit 1032. Thus, the physical channel signal demodulation unit 1041 is able to demodulate the uplink data by the data channel on the basis of control information transmitted by the control channel of the data frame. Further, the physical channel signal demodulation unit 1041 may include a carrier sense function. Note that, the reception unit 104 may input signal power in the frequency band to the higher layer unit 101 via the control unit 102 and the higher layer unit 101 may perform processing associated with carrier sense.

The AP 1 performs communication on the basis of the CSMA/CA described above, and is thus able to transmit a transmission frame only to a frequency band that is able to be reserved through carrier sense by the reception unit 104. The terminal apparatus including the AP 1 according to the present embodiment and the STAs 2 described below is able to change a CCA level and is able to use, for example, a CCA level higher than a CCA level used by the STAs 3 serving as the legacy terminal apparatuses. The CCA level used by the STAs 3 serving as the legacy terminal apparatuses is referred to as a legacy CCA level or a predetermined CCA level. Here, as the predetermined CCA level, a CCA level that has been already specified by the IEEE802.11 standard is able to be used. For example, when the terminal apparatus performs communication with a bandwidth of 20 MHz, the predetermined CCA level is able to be set as −82 dBm. A CCA level that is able to be used by the AP 1 or the STAs 2 and has a value different from a value of the predetermined CCA level is referred to as a variable CCA level. The variable CCA level is able to be decided by the AP 1 (or each of the STAs 2). The AP 1 (or the STA 2) is able to use a common variable CCA level in the BSS 1*a*. The AP 1 (or the STA 2) is able to notify a different terminal apparatus of information about the variable CCA level. The AP 1 (or the STA 2) is able to receive the information about the variable CCA level, which is transmitted by the different terminal apparatus, and change a value of the variable CCA level on the basis of the information.

The terminal apparatus including the AP 1 according to the present embodiment and the STAs 2 described below is able to change a period (time section) or cycle in which carrier sense is performed, and is able to use, for example, a carrier sense period shorter than a period (predetermined carrier sense period) in which the STAs 3 serving as the legacy terminal apparatuses perform carrier sense. When the carrier sense period is short, even when the AP 1 uses the predetermined CCA level, the AP 1 is able to improve an acquisition rate of transmission opportunity. That is, by changing the period in which carrier sense is performed, the AP 1 is able to provide an effect similar to that achievable when the CCA level is changed. For example, when the AP 1 has a shorter carrier sense period, it is possible to provide an effect similar to that achievable when the AP 1 has a higher CCA level. In the following description, when the AP 1 uses a method of making the CCA level higher than the predetermined CCA level, the AP 1 is able to use a method of making the carrier sense period shorter than the predetermined carrier sense period instead of the method of making the CCA level higher. When the AP 1 uses a method of making the CCA level lower than the predetermined CCA level, the AP 1 is able to use a method of making the carrier sense period longer instead of the method of making the CCA level lower. Of course, the AP 1 is able to simultaneously use a method of setting the CCA level as a value other than the predetermined CCA level and a method of setting the carrier sense period as a value other than the predetermined carrier sense period. Note that, as the predetermined carrier sense period, a carrier sense period that has been already specified by the IEEE802.11 standard is able to be used. For example, when the terminal apparatus performs communication with a bandwidth of 20 MHz, the predetermined carrier sense period is able to be set as 4 microseconds.

The AP 1 and the STAs 2 according to the present embodiment are able to transmit transmission frames by changing transmit power. For example, the AP 1 is able to transmit a transmission frame with transmit power higher than that of each of the STAs 3 serving as the legacy terminal apparatuses. The AP 1 is also able to transmit a transmission frame with transmit power lower than that of each of the STAs 3 serving as the legacy terminal apparatuses. The transmit power used by the STAs 3 serving as the legacy terminal apparatuses is referred to as legacy transmit power or predetermined transmit power. Maximum allowable transmit power is able to be designated as the predetermined transmit power. Maximum allowable power density is able to be designated as the maximum allowable transmit power. The maximum allowable power density is able to be set as, for example, 10 mW/MHz. Transmit power that is able to be used by the AP 1 or the STAs 2 and has a value different from a value of the predetermined transmit power is referred to as variable transmit power. Similarly to the predetermined transmit power, maximum allowable transmit power is able to be designated as the variable transmit power. The maximum allowable power density is able to be designated as the variable transmit power.

A value of a CCA level and a value of transmit power are parameters that have influence on an operation of the transmission unit 103 and an operation of the reception unit 104 in the AP 1 or the STAs 2. Thus, hereinafter, a value of a CCA level and a value of transmit power are also referred to as operation control parameters.

The operation control parameters are able to be decided in advance between the AP 1 and the STAs 2. The operation control parameters are able to be exchanged between the AP 1 and the STAs 2 by a management frame or a control frame.

The reception unit 104 of the AP 1 according to the present embodiment is able to change the CCA level on the basis of information of a MAC layer of a frame received by the radio reception unit 1042. In other words, the reception unit 104 is able to change a method of deciding the CCA level on the basis of the information of the MAC layer of the frame received by the radio reception unit 1042. In this case, the reception unit 104 is able to use, as the information of the MAC layer, information indicating a frame type of the frame. For example, when the frame received by the radio reception unit 1042 is a management frame or a control frame, the reception unit 104 is able to set the CCA level as a predetermined CCA level, and when the frame received by the radio reception unit 1042 is a data frame, the reception unit 104 is able to set the CCA level as a variable CCA level. Moreover, the radio unit 104 is able to set a value of the variable CCA level as a value higher than that of the predetermined CCA level. In other words, when the frame received by the radio reception unit 1042 has a predetermined frame type, the reception unit 104 according to the present embodiment needs to set the CCA level as the predetermined CCA level. Though the predetermined frame type is a management frame or a control frame in the example described above, the frame type included in the predetermined frame type is not limited to such an example. The reception unit 104 may decide the predetermined frame type with use of a sub-frame type. When the reception unit 104 changes the CCA level as described above, transmission opportunity of the AP 1 is able to be improved while compensating for reception quality of a management frame or a control frame transmitted by a different STA or AP. Whether or not to change the CCA level may be decided not by the reception unit 104 but by the higher layer unit 101.

The reception unit 104 is able to use, as the information of the MAC layer, information (for example, information of a retry field) indicating that the frame is either a first transmission frame or a retransmission frame. Definition of information described in the retry field is able to be definition specified by the IEEE802.11 standard. For example, a value described in the retry field designated for each frame being "0" indicates that the frame is a first transmission frame, and the value described in the retry field being "1" indicates that the frame is a retransmission frame.

When the frame received by the radio reception unit 1042 is a retransmission frame, the reception unit 104 is able to set the CCA level as a predetermined CCA level, and when the frame received by the radio reception unit 1042 is a first transmission frame, the reception unit 104 is able to set the CCA level as a variable CCA level. Moreover, the reception unit 104 is able to set a value of the variable CCA level as a value higher than that of the predetermined CCA level. In other words, when the frame received by the radio reception unit 1042 is a retransmission frame, the reception unit 104 needs to set the CCA level as the predetermined CCA level. When the reception unit 104 changes the CCA level as described above, it is possible to compensate for reception quality of a retransmission frame transmitted by a different STA or AP, so that transmission opportunity of the AP 1 is able to be improved while preventing an increase in the number of times of retransmission of the different STA or AP.

When the frame received by the radio reception unit 1042 is a first transmission frame, the reception unit 104 is able to set the CCA level as a predetermined CCA level, and when the frame received by the radio reception unit 1042 is a retransmission frame, the reception unit 104 is able to set the CCA level as a variable CCA level. Moreover, the reception unit 104 is able to set a value of the variable CCA level as a value higher than that of the predetermined CCA level. In other words, when the frame received by the radio reception unit 1042 is a first transmission frame, the reception unit 104 needs to set the CCA level as the predetermined CCA level. When the reception unit 104 changes the CCA level as described above, it is possible to compensate for reception quality of a first transmission frame transmitted by a different STA or AP, so that transmission opportunity of the AP 1 is able to be improved while reducing probability that the different STA or AP transmits a retransmission frame.

The reception unit 104 of the AP 1 according to the present embodiment is able to change the CCA level on the basis of a value of CW. For example, when a value of the CW is less than a predetermined value, the reception unit 104 is able to set the CCA level as a predetermined CCA level, and when the value of the CW is equal to or greater than the predetermined value, the reception unit 104 is able to set the CCA level as a value other than the predetermined CCA level. In other words, when the value of the CW is less than the predetermined value, the reception unit 104 needs to set the CCA level as the predetermined CCA level. Note that, the predetermined value is not limited, and the reception unit 104 is able to set, as the predetermined value, a value of the CW used when a frame for transmission that is expected to be transmitted by the transmission unit 103 is a first retransmission frame, for example.

The reception unit 104 of the AP 1 according to the present embodiment is able to change the CCA level on the basis of information of a PHY layer of a frame received by the radio reception unit 1042. In this case, the reception unit 104 is able to use, as the information of the PHY layer, information indicating a data rate of the frame. For example, when a value of the data rate of the frame received by the radio reception unit 1042 is equal to or less than a predetermined value, the reception unit 104 is able to set the CCA level as a predetermined CCA level, and when the value of the data rate of the frame received by the radio reception unit 1042 is equal to or greater than the predetermined value, the reception unit 104 is able to set the CCA level as a variable CCA level. In other words, when the value of the data rate of the frame received by the radio reception unit 1042 is equal to or less than the predetermined value, the reception unit 104 needs to set the CCA level as the predetermined CCA level. Note that, the predetermined value is not limited, and may be, for example, a value half or quarter of a value of the maximum data rate at which transmission is able to be performed by the AP 1. The information indicating the data rate may be information indicating the data rate itself or may be information indicating a modulation scheme, a coding rate, or the number of data streams. A different terminal apparatus (different AP or STA) transmitting a frame to which a high data rate is set is expected to provide a favorable state of a channel between the different terminal apparatus and a terminal as a destination of the frame, so that even when the AP 1 according to the present embodiment, while observing the frame, transmits a frame, reception quality of the frame transmitted by the different terminal apparatus is expected to be kept high. Thus, it is possible to improve transmission opportunity of the AP 1 while compensating for reception quality of a frame transmitted by the different AP or STA.

The reception unit 104 of the AP 1 according to the present embodiment is able to change the CCA level on the basis of information indicating a transmission terminal of a frame received by the radio reception unit 1042. In this case, the reception unit 104 is able to use, as the information indicating the transmission terminal, GID included in the frame. For example, when the GID included in the frame received by the radio reception unit 1042 indicates that a terminal apparatus that has transmitted the frame is an STA, the reception unit 104 is able to set the CCA level as a predetermined CCA level, and when the GID included in the frame received by the radio reception unit 1042 indicates that a terminal apparatus that has transmitted the frame is an AP, the reception unit 104 is able to set the CCA level as a variable CCA level. In other words, when a transmission source of the frame received by the radio reception unit 1042 is a predetermined terminal apparatus, the reception unit 104 needs to set the CCA level as the predetermined CCA level. Note that, the predetermined terminal apparatus is not limited, and the predetermined terminal apparatus in the example described above is an STA, but the predetermined terminal apparatus may be, for example, a terminal apparatus having a specific address (MAC address or AID). Since the frame whose transmission source is an STA has high possibility of having low transmit power given, when the reception unit 104 uses the predetermined CCA level, it is possible to improve transmission opportunity of the AP 1 while compensating for reception quality of the frame whose transmission source is the STA.

The reception unit 104 of the AP 1 according to the present embodiment is able to change the CCA level with a method similar to the method described above on the basis of information of a MAC layer or a PHY layer of a frame (also referred to as a frame for transmission) that is expected to be transmitted from now on by the transmission unit 103. For example, the reception unit 104 is able to use, as the information of the MAC layer, information indicating a frame type of the frame. For example, when the frame type of the frame that is expected to be transmitted from now on by the transmission unit 103 is a management frame or a control frame, the reception unit 104 is able to set the CCA level as a predetermined CCA level, and when the frame type of the frame that is expected to be transmitted from now on by the transmission unit 103 is a data frame, the reception unit 104 is able to set the CCA level as a variable CCA level. Moreover, the radio unit 104 is able to set a value of the variable CCA level as a value higher than that of the predetermined CCA level. In other words, when the frame type of the frame that is expected to be transmitted from now on by the transmission unit 103 is a predetermined frame type, the reception unit 104 according to the present embodiment needs to set the CCA level as the predetermined CCA level. Though the predetermined frame type is a management frame or a control frame in the example described above, the frame type included in the predetermined frame type is not limited to such an example. When the reception unit 104 changes the CCA level as described above, transmission opportunity of the AP 1 is able to be improved while compensating for reception quality of a management frame or a control frame transmitted by the AP 1.

The transmission unit 103 of the AP 1 according to the present embodiment is able to change the transmit power on the basis of information of a MAC layer of a frame received by the radio reception unit 1042. In other words, the transmission unit 103 is able to change a method of deciding the transmit power on the basis of the information of the MAC layer of the frame received by the radio reception unit 1042. In this case, the transmission unit 103 is able to use, as the information of the MAC layer, information indicating a frame type of the frame. For example, when the frame received by the radio reception unit 1042 is a data frame, the reception unit 104 is able to set the transmit power as predetermined transmit power, and when the frame received by the radio reception unit 1042 is a management frame or a control frame, the reception unit 104 is able to set the transmit power as variable transmit power. Moreover, the transmission unit 103 is able to set a value of the variable transmit power as a value lower than that of the predetermined transmit power. In other words, when the frame received by the radio reception unit 1042 has a predetermined frame type, the transmission unit 103 according to the present embodiment needs to set the transmit power as the predetermined transmit power. Though the predetermined frame type is a data frame in the example escribed above, the frame type included in the predetermined frame type is not limited to such an example. When the transmission unit 103 changes the transmit power as described above, reception quality of a frame transmitted by the AP 1 is able to be improved while compensating for reception quality of a management frame or a control frame transmitted by a different STA or AP.

The transmission unit 103 of the AP 1 according to the present embodiment is able to change the transmit power on the basis of information of a PHY layer of a frame received by the radio reception unit 1042. In this case, the transmission unit 103 is able to use, as the information of the PHY layer, information indicating a data rate. For example, when a value of the data rate of the frame received by the radio reception unit 1042 is equal to or greater than a predetermined value, the transmission unit 103 is able to set the transmit power as predetermined transmit power, and when the value of the data rate of the frame received by the radio reception unit 1042 is equal to or less than the predetermined value, the transmission unit 103 is able to set the transmit power as variable transmit power. In other words, when the value of the data rate of the frame received by the radio reception unit 1042 is equal to or greater than the predetermined value, the transmission unit 103 is able to set the transmit power as the predetermined transmit power. Note that, the predetermined value is not limited, and may be, for example, a value half or quarter of a value of the maximum data rate at which transmission is able to be performed by the AP 1. The information indicating the data rate may be information indicating the data rate itself or may be information indicating a modulation scheme, a coding rate, or the number of data streams. A different terminal apparatus (different AP or STA) transmitting a frame to which a high data rate is set is expected to provide a favorable state of a channel between the different terminal apparatus and a terminal as a destination of the frame, so that even when the AP 1 according to the present embodiment, while observing the frame, transmits a frame, reception quality of the frame transmitted by the different terminal apparatus is expected to be kept high. Thus, it is possible to improve reception quality of the frame transmitted by the AP 1 while compensating for reception quality of a frame transmitted by the different AP or STA.

The transmission unit 103 of the AP 1 according to the present embodiment is able to change the transmit power on the basis of information of a MAC layer or a PHY layer of a frame to be transmitted from now on. For example, the transmission unit 103 is able to use, as the information of the MAC layer, information indicating a frame type of the frame. For example, when the frame type of the frame to be transmitted from now on is a management frame or a control frame, the transmission unit 103 is able to set the transmit power as predetermined transmit power, and when the frame type of the frame to be transmitted from now on by the transmission unit 103 is a data frame, the transmission unit 103 is able to set the transmit power as variable transmit power. Moreover, the transmission unit 103 is able to set a value of the variable transmit power as a value lower than that of the predetermined transmit power. In other words, when the frame type of the frame that is expected to be transmitted from now on is a predetermined frame type, the transmission unit 103 according to the present embodiment needs to set the transmit power as the predetermined transmit power. Though the predetermined frame type is a management frame or a control frame in the example described above, the frame type included in the predetermined frame type is not limited to such an example. When the transmission unit 103 changes the transmit power as described above, transmission opportunity of the AP 1 is able to be improved while compensating for reception quality of a management frame or a control frame transmitted by the AP 1.

The transmission unit 103 and the reception unit 104 of the AP 1 according to the present embodiment are able to change a value of the CCA level and a value of the transmit power in association with each other. For example, when the reception unit 104 changes the CCA level from a predetermined CCA level to a variable CCA level with the method described above, the transmission unit 103 is able to change the transmit power of a frame to be transmitted from now on from predetermined transmit power to variable transmit power. This is called first transmit power control in the transmission unit 103. On the other hand, as described above, the transmission unit 103 is also able to change the transmit power on the basis of information of a MAC layer or a PHY layer of the frame to be transmitted from now on. This is called second transmit power control in the transmission unit 103. The transmission unit 103 is able to preferentially execute the first transmit power control over the second transmit power control. With the first transmit power control, a difference between the variable transmit power and the predetermined transmit power that are used by the transmission unit 103 is allowed to have the same value as a difference between the predetermined CCA level and the variable CCA level in the reception unit 104.

When the transmission unit 103 changes the transmit power from the predetermined transmit power to the variable transmit power with the method as described above, the reception unit 104 is able to change the CCA level from the predetermined CCA level to the variable CCA level. This is called first CCA control in the reception unit 104. On the other hand, as described above, the reception unit 104 is also able to change the CCA level on the basis of information of a MAC layer or a PHY layer of the received frame. This is called second CCA control in the reception unit 104. The reception unit 104 is able to preferentially execute the first CCA control over the second CCA control.

The transmission unit 103 is able to include, in a MAC layer or a PHY layer or both a MAC layer and a PHY layer of the frame to be transmitted from now on, information for permitting a terminal apparatus as a destination of the frame to change the CCA level or transmit power. The transmission unit 103 is also able to include, in a MAC layer or a PHY layer or both a MAC layer and a PHY layer of the frame to be transmitted from now on, information for prohibiting a terminal apparatus as a destination of the frame from changing the CCA level or transmit power. The frame that includes such information is called an opportunity control frame. For example, when the reception unit 104 of the AP 1 receives the opportunity control frame, the transmission unit 103 and the reception unit 104 of the AP 1 are able to decide, on the basis of the information included in the opportunity control frame, whether or not to perform transmit power control or CCA level control. For example, when information for inhibiting transmit power control is included in the opportunity control frame received by the reception unit 104 of the AP 1, the transmission unit 103 of the AP 1 needs to use predetermined transmit power to transmit a frame to be transmitted from now on. Note that, an effective period of information described in the opportunity control frame may be decided in advance between the AP 1 and each of the STAs 2 and the opportunity control frame may include information indicating the effective period.

According to the AP 1 described above, the transmission unit 103 and the reception unit 104 are able to respectively and independently change the transmit power and the CCA level. The transmission unit 103 and the reception unit 104 are able to change the transmit power and the CCA level in association with each other. Since such transmission unit 103 and reception unit 104 are able to efficiently change the transmit power and the CCA level, it is possible to improve an acquisition rate of transmission opportunity of the AP 1 and reception quality of a frame transmitted by the AP 1 while compensating for reception quality of a frame transmitted by a different terminal apparatus in the BSS 1a, so that it is possible to improve radio resource efficiency in the BSS 1a and radio resource efficiency of the AP 1, thus making it possible to improve throughput of each of the terminal apparatuses in the BSS 1a.

A program which runs in the AP 1, the STAs 2, and the STAs 3 according to the invention is a program that controls a CPU and the like (program that causes a computer to function) such that the functions in the aforementioned embodiment concerning the invention are realized. The pieces of information handled by the apparatuses are temporarily accumulated in a RAM during the processing thereof, and then stored in various ROMs and HDDs and read, corrected, and written by the CPU when necessary. A recording medium that stores the program therein may be any of a semiconductor medium (for example, a ROM, a nonvolatile memory card or the like), an optical recording medium (for example, a DVD, an MO, an MD, a CD, a BD or the like), a magnetic recording medium (for example, a magnetic tape, a flexible disc or the like), and the like. Moreover, there is also a case where, by executing the loaded program, not only the functions of the aforementioned embodiment are realized, but also by performing processing in cooperation with an operating system, other application programs or the like on the basis of an instruction of the program, the functions of the invention may be realized.

When being distributed in the market, the program is able to be stored in a portable recording medium and distributed or be transferred to a server computer connected through a network such as the Internet. In this case, a storage apparatus of the server computer is also included in the invention. A part or all of the AP 1, the STAs 2, and the STAs 3 in the aforementioned embodiment may be realized as an LSI which is a typical integrated circuit. Each functional block of the AP 1, the STAs 2, and the STAs 3 may be individually formed into a chip, or a part or all thereof may be integrated and formed into a chip. When each functional block is made into an integrated circuit, an integrated circuit control unit for controlling them is added.

Further, a method for making into an integrated circuit is not limited to the LSI and a dedicated circuit or a versatile processor may be used for realization. Further, in a case where a technique for making into an integrated circuit in place of the LSI appears with advance of a semiconductor technique, an integrated circuit by the technique is also able to be used.

Note that, the invention of the present application is not limited to the aforementioned embodiment. The AP 1, the STAs 2, and the STAs 3 of the present application are not limited to be applied to a mobile station apparatus, but, needless to say, are applicable to stationary or unmovable electronic equipment which is installed indoors or outdoors such as, for example, AV equipment, kitchen equipment, cleaning/washing machine, air conditioning equipment, office equipment, automatic vending machine, other domestic equipment, and the like.

As above, the embodiment of the invention has been described in detail with reference to the drawings, but specific configurations are not limited to the embodiment, and a design and the like which are not departed from the main subject of the invention are also included in the scope of claims.

INDUSTRIAL APPLICABILITY

The invention is suitably used for a radio transmission apparatus, a radio receiving apparatus, a communication system, and a communication method.

Note that, the present international application claims priority from Japanese Patent Application No. 2015-047816 filed on Mar. 11, 2015, and the entire contents of Japanese Patent Application No. 2015-047816 are hereby incorporated herein by reference.

REFERENCE SIGNS LIST

1 AP
2, 2-1, 2-2, 2-3, 2-4, 3, 3-1, 3-2, 3-3, 3-4 STA
101 higher layer unit
102 control unit
103 transmission unit
104 reception unit
105 antenna
1031 physical channel signal generation unit
1032 frame configuration unit
1033 control signal generation unit
1034 radio transmission unit
1041 physical channel signal demodulation unit
1042 radio reception unit

The invention claimed is:

1. A first terminal apparatus that performs communication with a second terminal apparatus, the first terminal apparatus comprising:
   reception circuitry configured to receive a first frame including a physical (PHY) layer, and in a case of receiving the first frame, selectively perform either a first carrier sense carried out based on a predetermined carrier sense level value or a second carrier sense carried out based on a carrier sense level value higher than the predetermined carrier sense level value;
   control circuitry configured to interpret the first frame; and
   transmission circuitry configured to transmit a second frame, wherein:
   the PHY layer including first information indicating whether to prohibit the reception circuitry from performing the second carrier sense,
   second information associated with a transmit power set by the transmission circuitry is included in the PHY layer in a case where the reception circuitry performs the second carrier sense,
   the second information is third information indicating a maximum transmit power that can be set to the second frame for transmission by the transmission circuitry in a case where the reception circuitry performs the second carrier sense,
   the third information includes a setting that matches (i) a difference between the maximum transmit power that can be set to the second frame in the case where the performing the second carrier sense and a transmit power set to the second frame in the case where the performing the first carrier sense with (ii) a difference between the carrier sense level value higher than the predetermined carrier sense level value and the predetermined carrier sense level value,
   the first information is information to the first terminal apparatus that selectively performs either the first carrier sense or the second carrier sense, and the reception circuitry selectively performs either the first carrier sense or the second carrier sense based on the first information.

2. A communication method of a first terminal apparatus that performs communication with a second terminal apparatus, the communication method comprising:
- receiving a first frame including a physical (PHY) layer and selectively performing either a first carrier sense carried out based on a predetermined carrier sense level value or a second carrier sense carried out based on a carrier sense level value higher than the predetermined carrier sense level value;
- interpreting the first frame; and
- transmitting a second frame, wherein:
- the PHY layer including first information indicating whether to prohibit performing the second carrier sense,
- second information associated with a transmit power is included in the PHY layer in a case where the second carrier sense is performed,
- the second information is third information indicating a maximum transmit power that can be set to transmit the second frame in a case where the second carrier sense is performed,
- the third information includes a setting that matches (i) a difference between the maximum transmit power that can be set to the second frame in the case where the performing the second carrier sense and a transmit power set to the second frame in the case where the performing the first carrier sense with (ii) a difference between the carrier sense level value higher than the predetermined carrier sense level value and the predetermined carrier sense level value,
- the first information is information to the first terminal apparatus that selectively performs either the first carrier sense or the second carrier sense, and
- either the first carrier sense or the second carrier sense is selectively performed based on the first information.

* * * * *